United States Patent Office 3,517,026
Patented June 23, 1970

3,517,026
PORPHIN SYNTHESIS
Richard G. Yalman, Yellow Springs, Ohio, assignor to the United States of America as represented by the Secretary of the Department of Health, Education, and Welfare
No Drawing. Filed Oct. 27, 1966, Ser. No. 589,842
Int. Cl. C09b 47/00
U.S. Cl. 260—314                                7 Claims

ABSTRACT OF THE DISCLOSURE

Porphins are prepared by heating the reactants, pyrrole and an aldehyde, dissolved in a solvent, under pressure to the critical temperature of the solvent.

---

This invention relates to the preparation of porphins or tetrapyrroles wherein the reactants, pyrrole and an aldehyde, are dissolved in a solvent and the reaction conducted under critical conditions with respect to the solvent. In other words, the solution of reactants is heated under pressure to the critical temperature of the solvent.

The reaction between pyrrole and aldehydes to produce porphins is known. See, for example, U.S. Pat. 3,076,813. The prior art reactions, whether conducted in the presence or absence of a solvent, required prolonged reaction times, on the order of many hours or days. The method of this invention, on the other hand, requires but a few minutes to produce substantial yields of porphins.

According to the invention, pyrrole and an aldehyde are introduced along with a solvent into a pressure vessel and the temperature raised to the critical temperature of the solvent for a few minutes to accomplish the condensation reaction. The temperature depends on the particular solvent employed. Generally, improved yields are favored by low temperatures. Suitable solvents include the following low boiling materials:

| Solvent | B.P., °C. | Critical temp., °C. | Critical press atm. |
|---|---|---|---|
| Trimethylamine | 3.5 | 160.1 | 40.2 |
| 1,2 dichlorotetrafluoroethene | 7.8 | 146 | 35.5 |
| Dichlorodifluoromethane | 29.8 | 111.5 | 39.6 |
| Trichlorofluoromethane | 23.7 | 198 | 43.2 |

Mixtures of solvents may be employed.

By "critical temperature" as used herein is meant the range of the critical temperature of the solvent plus or minus about 5° C. In other words, the reaction is accomplished at or close to critical conditions.

The reaction system also preferably includes metal ions which form chelates with the resulting porphin. Suitable metal ions are provided by the organic or inorganic salts of such metals as Ca, Cu, Ag, Pb, Fe, Ni, Co, Cr, Al and Zn, for example. Zinc acetate is a preferred material.

The aldehyde reactant may be an aliphatic, aromatic, or cyclic including heterocyclic aldehyde. Examples include formaldehyde, propionaldehyde, acetaldehyde, benzaldehyde, naphthaldehyde and carboxaldehydes of thiophene, pyridine, cyclohexane and the like. Mixtures of different aldehydes may be employed to yield unsymmetrical porphins. Substituted pyrroles may be employed where the substituent, preferably lower alkyl, is on the 3 or 4 position.

The reaction may be conveniently accomplished in a bomb. Weighed amounts of the reactants are added to the bomb, the bomb cooled to about −40° C., solvent pre-cooled to about −40° C. added and the bomb sealed. The bomb is then placed in a furnace preheated to the critical temperature of the solvent employed, brought to the ambient temperature and held there for a short time, the bomb cooled and thereafter the pressure released.

The mole ratio of reactants is not critical, but it is preferred to employ a molar excess of aldehyde. The preferred mole ratios, employed in the examples herein, are as follows:

| Substance: | Moles |
|---|---|
| Solvent | 1.0 |
| Pyrrole | .57 |
| Aldehyde | .8 |
| Zinc acetate | .22 |

EXAMPLE I

A 10 ml. laboratory bomb was charged with the following according to the procedure described above:

| | G. |
|---|---|
| Trimethylamine | 2.33 |
| Pyrrole | 1.55 |
| Paraldehyde | 1.0 |
| Zinc acetate | 1.4 |

The bomb was sealed and placed in a tube furnace held at 161–164° C., permitted to attain ambient temperature and held for 15 minutes. After cooling the bomb was opened and the product recovered as set forth hereinafter. The product, porphine, was recovered in an amount of 5.7 mg.

The above preparation was repeated at a temperature of 200° C. for 48 hours, which yielded no detectable amount of porphine. A further preparation at 190° C. for one hour yielded 1.6 mg. of porphine.

EXAMPLE II

A 47 ml. bomb was charged with the following:

| | G. |
|---|---|
| Trimethylamine | 11 |
| Pyrrole | 7 |
| Propionaldehyde | 8.4 |
| Zinc acetate | 6 |

The bomb was heated as in Example I at 161–164° C. until the pressure within the bomb attained 47.5 atmospheres and held there for 1 minute. The yield was 112 mg. of $\alpha$, $\beta$, $\gamma$, $\delta$-tetraethylporphine.

EXAMPLE III

A 10 ml. bomb and a 47 ml. bomb were charged with the following:

| | 10 ml. | 47 ml. |
|---|---|---|
| 1,2 dichlorotetrafluoroethane (g.) | 5.6 | 26.3 |
| Pyrrole (g.) | 0.8 | 4.0 |
| Propionaldehyde (g.) | 1.0 | 4.6 |
| Zinc acetate (g.) | 1.4 | 6.0 |

The 10 ml. bomb heated to 145–148° C. for 15 minutes yielded 3.5 mg. of $\alpha,\beta,\gamma,\delta$-tetraethylporphine. The 47 ml. bomb was heated at 145–148° C. until the pressure attained 35 atmospheres for 1 minute. The yield was 32 mg.

From the data in Example I, it is apparent that lower temperatures and short reaction times result in increased yields.

The products of Example I were purified by the method of Priesthoff and Banks, J. Am. Chem. Soc. 76, 937 (1954) which consisted of continuously washing a chloroform solution of the reaction product with HCl followed by neutralization and water washing until the washings were clear. In the course of the neutralization considerable tars were formed which interfered with the washing efficiency. The chloroform layer was further purified by column chromatography on alumina employing chloroform as the elutant.

The product of Example II was purified by direct chromatography on alumina of the reaction product dissolved in chloroform.

The products of Example III were dissolved in chloroform, the chloroform evaporated, and the residue extracted in a Soxhlet with benzene for twelve hours according to the method of Horeczy, Analyt. Chem. 27, 1899 (1955).

While the invention has been described in terms of certain examples, they are to be considered illustrative rather than limiting and it is intended to cover all modifications which fall within the spirit and scope of the appended claims.

I claim:

1. The process for the preparation of a porphin comprising dissolving pyrrole, an aldehyde and a metal salt chelating agent in a solvent selected from the group consisting of chlorofluorocarbons, low boiling amines and mixtures thereof, heating said solution under pressure in a sealed vessel to within plus or minus about 5° C. of the critical temperature of the solvent and recovering the resultant porphin therefrom.

2. The process of claim 1 wherein said solvent is dichlorodifluoromethane.

3. The process of claim 1 wherein said solvent is tricholorofluoromethane.

4. The process of claim 1, wherein said aldehyde is formaldehyde and porphine is recovered.

5. The process of claim 1, wherein said aldehyde is propionaldehyde and $\alpha,\beta,\gamma,\delta$-tetraethylporphine is recovered.

6. The process of claim 1, wherein said solvent is 1,2-dichlorotetrafluoroethane.

7. The process of claim 1, wherein said solvent is trimethylamine.

References Cited

UNITED STATES PATENTS 3,076,813  2/1963  Sharp _____ 260—314

OTHER REFERENCES

Sienko et al., Chemistry, 2nd ed. (McGraw-Hill Book Co., Inc.) (N.Y.) (1961), p. 241.

HENRY R. JILES, Primary Examiner

H. I. MOATZ, Assistant Examiner

U.S. Cl. X.R.

260—296